Aug. 8, 1950          H. CORBETT          2,518,124
MACHINE FOR MIXING AND MOLDING PLASTIC MATERIALS
Filed Feb. 10, 1948          4 Sheets-Sheet 4
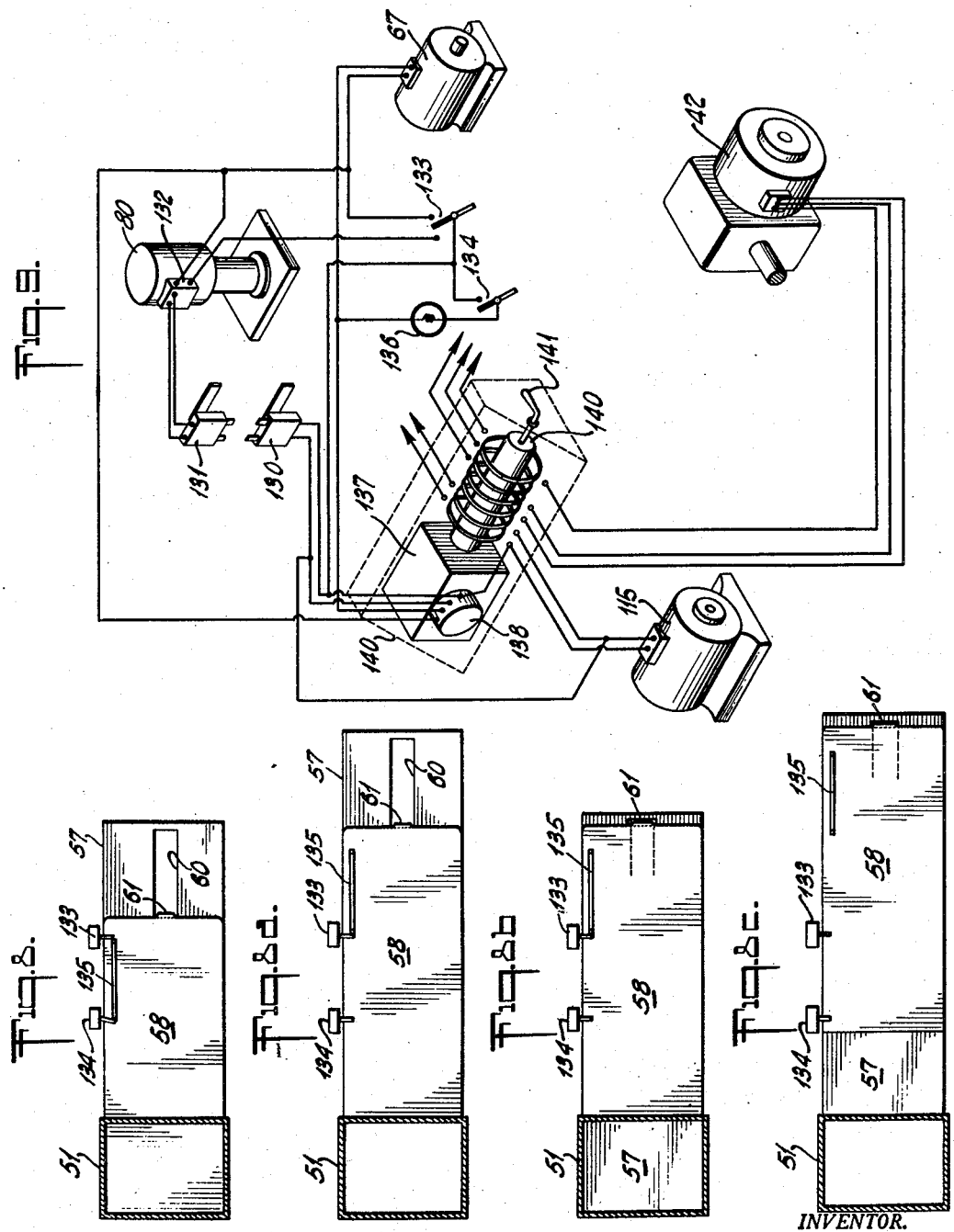
INVENTOR.
HAROLD CORBETT.
BY
Samuel Stearman
ATTORNEY Patented Aug. 8, 1950

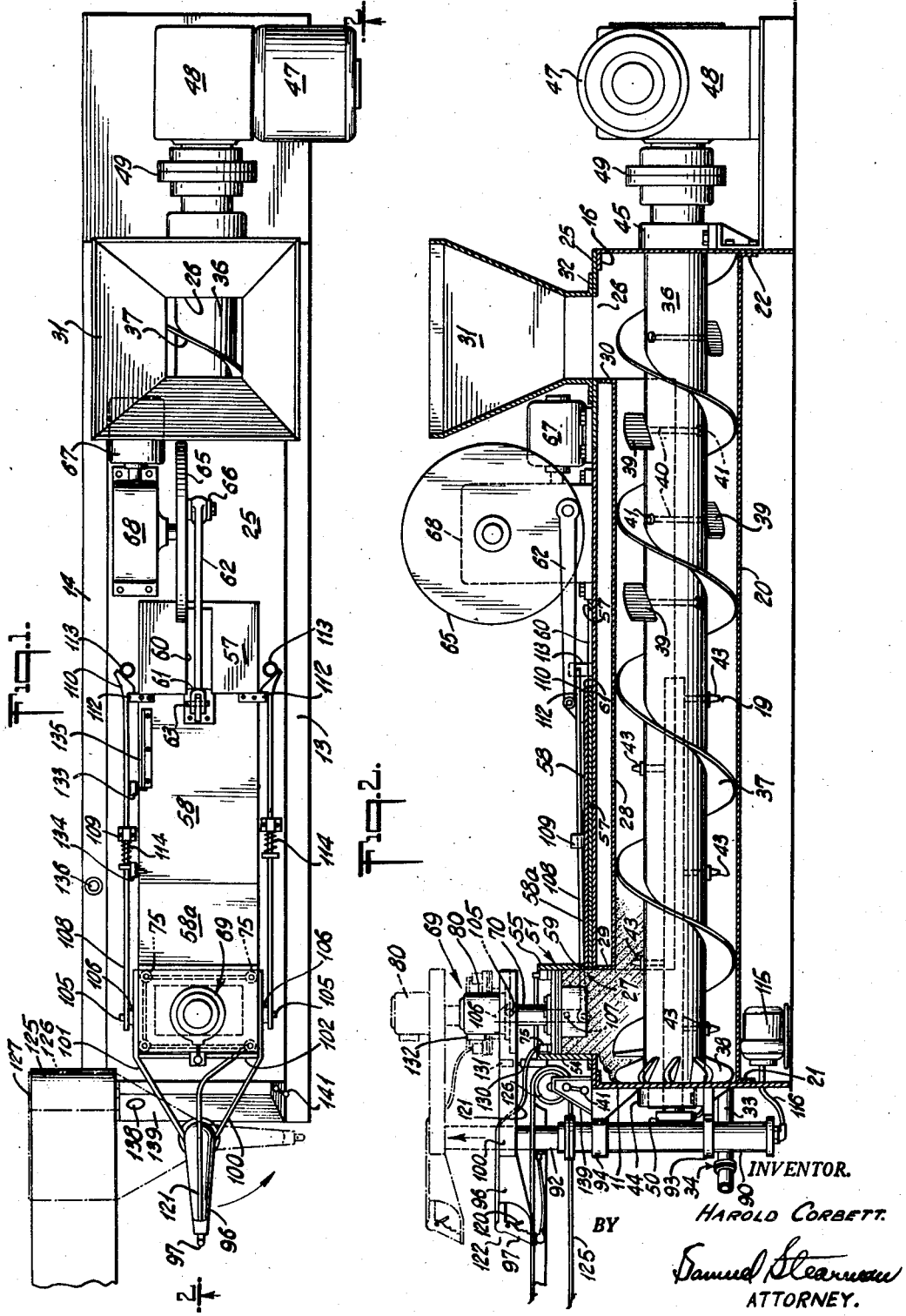

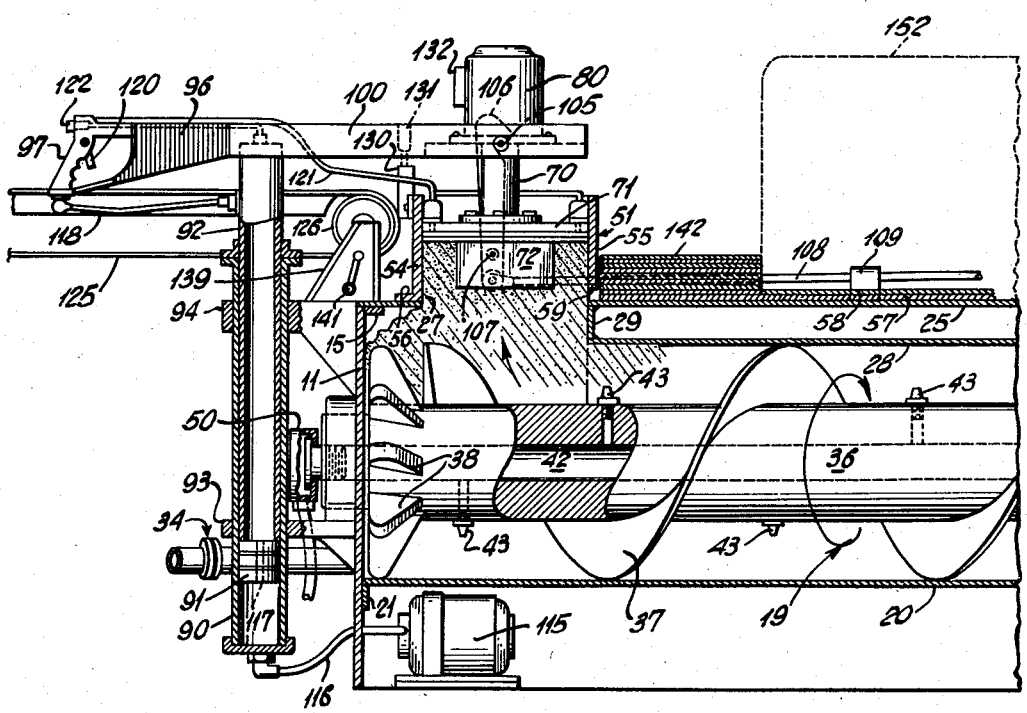

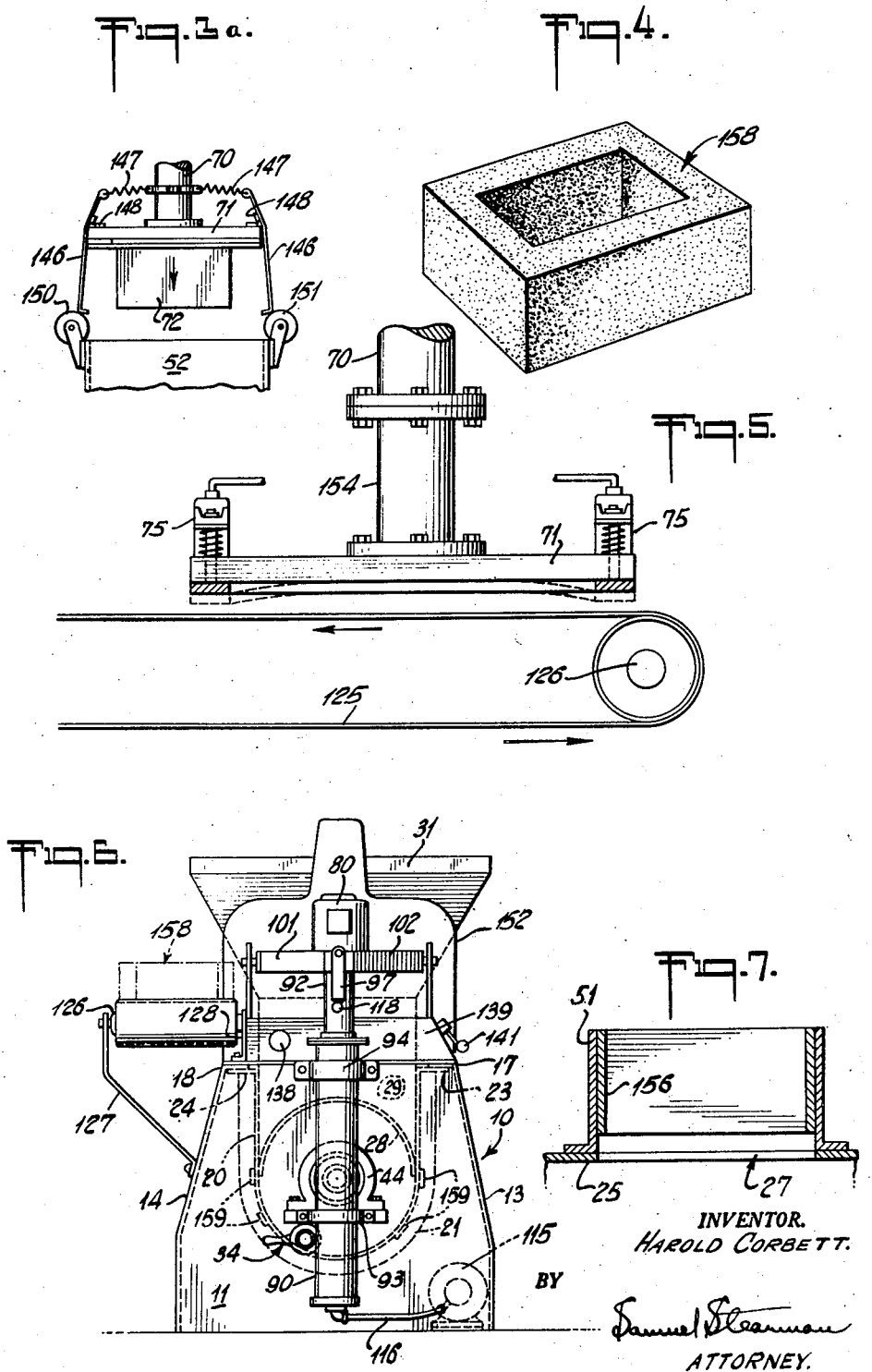

2,518,124

UNITED STATES PATENT OFFICE 2,518,124

MACHINE FOR MIXING AND MOLDING PLASTIC MATERIALS

Harold Corbett, East Orange, N. J.

Application February 10, 1948, Serial No. 7,346

12 Claims. (Cl. 25—41)

This invention relates to a machine for molding plastic materials. Although not confined thereto, the invention is particularly concerned with a machine for molding concrete, bituminous molding compositions and the like.

In the manufacture of molded products from plastic compositions, the various raw materials are generally mixed batch-wise in some suitable mixer and then transferred, often by hand or in a portable conveyor, to a separate machine where the molding operation is carried out. This procedure is wasteful of both time and manpower. Further, machines commonly used for molding plastic compositions, such as concrete, into building blocks and the like involve extensive manual labor in their operation and such concrete block machines are generally not suitable for making other products such as tiles or for handling other plastic molding compositions, such as those containing bituminous materials or those containing liquid or solid resinous plastics.

It is the object of this invention to provide a single integrated machine in which plastic compositions may be both mixed and molded, which is simple to operate, which eliminates unnecessary handling of the molding material and which is adapted to compound a variety of plastic compositions and to mold them into a variety of forms.

According to the invention there is provided a machine having a mixing chamber in which the various components of the plastic composition to be processed are continuously mixed and compounded and from which the compounded mixture is intermittently transferred directly into a molding compartment where the molding operation is performed while additional quantities of the plastic molding composition are being simultaneously mixed.

A feature of the invention resides in the relative positions and arrangement of the raw material charging port and of the molding compartment in relation to the mixing chamber with which they communicate, whereby the individual components of the molding composition are mixed while being conveyed through the mixing chamber to the molding compartment.

Another feature of the invention resides in the arrangement and construction of the molding compartment and in the provision of means whereby the molding compartment may be isolated from the mixing chamber, the molding operation carried out and the product removed from the molding compartment without interrupting the mixing operation.

Other features and advantages of the invention will be apparent from the more detailed description which follows and from the accompanying drawings in which, Fig. 1 is a plan view of a machine embodying the invention;

Fig. 2 is a view partly in section and partly in elevation taken approximately on the line 2—2 of Fig. 1;

Fig. 2a is a more detailed view, partly in section and partly in elevation, of the molding end of the machine;

Fig. 3 is a view partly in section and partly in elevation of the molding unit, showing the manner in which concrete products may be handled;

Fig. 3a is a diagrammatic view illustrating the handling of the pallet-supporting devices when the molding unit is returned to the molding compartment;

Fig. 4 is a view in perspective of one type of product which may be molded in the machine of the invention;

Fig. 5 is a view in elevation showing the handling of thin products such as tiles;

Fig. 6 is an end elevation of the molding end of the machine of the invention;

Fig. 7 is a view in section of the molding compartment illustrating the use of liners;

Figs. 8, 8a, 8b and 8c are diagrammatic views showing the molding compartment gates at various stages during the operation of the machine; and Fig. 9 is a diagrammatic view of the electrical circuits involved in the embodiment of the invention illustrated.

Referring to the drawings, the numeral 10 designates generally the body of the machine comprising end walls 11 and 12, and side walls 13 and 14 secured as by welding to the end walls. The upper ends of the walls 11, 12, 13 and 14 are formed wtih inwardly extending flanges 15, 16, 17 and 18, respectively. A trough-shaped mixing chamber 19 is formed by a curved wall 20 which is provided at its ends with outwardly extending flanges 21 and 22, bolted or otherwise secured to the interior faces of the end walls 11 and 12, respectively, the upper edges of wall 20 being formed with flanges 23 and 24 secured to flanges 17 and 18, respectively. The body 10 of the machine is provided with a top 25 which rests upon and may be secured, as by bolting, to flanges 15, 16, 17 and 18. For convenience in gaining access to the interior of the machine, the top 25 may be formed of two or more abutting plates.

A charging port 26 and a molding port 27 provide access to the interior of chamber 19 adjacent opposite ends thereof. A semi-circular wall 28 having upwardly extending end plates 29 and 30 forms a centrally-positioned cylindrical section in chamber 19. The lower edges of wall 28 may be beveled to facilitate the junction with wall 20. End plates 29 and 30 extend across chamber 19 and upwardly to top 25 and may be appropriately flanged and bolted to top 25 and side walls 13 and 14. A hopper 31 having a flange 32 is positioned over charging port 26 and secured, as by bolting, to top 25. An outlet pipe 33 in wall 11 adjacent the bottom of chamber 19 is provided to permit the removal of liquid material from the chamber as, for example, when the machine is being cleaned out. Outlet pipe 33 is closed by a valve 34.

A mixing and pressure conveying mechanism is provided in chamber 19 and comprises a shaft 36 carrying a helical screw 37. Impeller blades 38, having a pitch opposite to that of helical screw 37, are mounted on shaft 36 adjacent end wall 11 and adjustable-pitch mixing blades 39 are mounted on shaft 36 intermediate the helical screw 37. Each adjustable-pitch mixing blade has a stem 40 extending through shaft 36 and is held in position by a nut 41. Four mixing blades are shown in the embodiment illustrated in Fig. 2 but it will be obvious that additional mixing blades may be provided. Shaft 36 is provided with a bore 42 extending about half-way along the axis thereof. Nozzles 43 are mounted in shaft 36 and provide means whereby liquids forced into the bore 42 may be discharged into chamber 19. The ends of shaft 36 pass through appropriate openings in walls 11 and 12 and are supported in bearings 44 and 45, respectively, a liquid seal being provided by suitable packing glands (not shown). Shaft 36 is driven by a reversible motor 47 through reducing gears in gear box 48. A coupling 49 is provided in order that the driving mechanism may be conveniently separated from shaft 36. The end of shaft 36 which passes through wall 11 and is supported in bearing 44 is provided with a conventional swivel valve 50 having a flow regulator plate, in order that liquids may be introduced into bore 42 either continuously or intermittently while the shaft 36 is being driven.

The molding operation is carried out in a molding compartment 51 which is formed by side walls 52 and 53 and end walls 54 and 55, welded or otherwise secured to the side walls. The lower ends of walls 52, 53 and 54 are provided with an outwardly extending flange 56 which is bolted to top 25 along the periphery of molding port 27. Means for intermittently closing molding port 27 with a bottom or bedplate for the molding compartment and thereby isolate the molding compartment 51 from chamber 19 is provided by a lower gate 57 and a superposed upper gate 58. These gates, which have a width equal to the inside width of molding compartment 51, are adapted to slide along top 25 and enter molding compartment 51 through an aperture 59 provided by cutting off a portion of the lower end of the wall 55. Lower gate 57 is provided with a rectangular slot 60 which is adapted to receive a catch 61 extending downwardly from the end of upper gate 58. The catch 61 is free to travel in slot 60 and to move lower gate 57 in response to the movements of upper gate 58 which is driven directly. In the embodiment illustrated, a reciprocating movement is imparted to upper gate 58 by means of a mechanism comprising a connecting rod 62 secured at one end to upper gate 58 by a clevis mounting 63 and secured at its other end to a wheel 65 by a bearing 66 which is eccentrically positioned on wheel 65. Wheel 65 is driven by a motor 67 through a gear box 68. It will be obvious that other means for moving upper gate 58 may be provided as, for example, a hydraulic or a pneumatic mechanism. In order to provide for the use of pallets when compositions such as concrete or the like are being handled as hereinafter described, the upper gate 58 may have a detachably secured forward portion 58a.

The material to be molded, which is transferred from chamber 19 into molding compartment 51, is compressed by a molding unit 69 comprising a hydraulic ram 70 having a plate 71 secured to its lower end. Plate 71 may carry a hollow mold core 72 bolted to the underside thereof. Air-operated ejector units 75 having pistons 76 are mounted at each corner of plate 71. Pistons 76 extend through holes in plate 71 and are secured to a frame 77 which is held by the pistons against the lower face of plate 71. A compression plate 78 which conforms in shape and size to the cross-sectional area of the space between the walls of molding compartment 51 and the mold core 72, may be secured to frame 77.

Hydraulic ram 70 is actuated by a self-contained hydraulic pump unit 80, the ram 70 being attached to the piston 81 of the hydraulic pump. The hydraulic pump unit illustrated in the drawings is not per se a part of the present invention. The pump unit 80 is mounted on a supporting tray 82 having a rim 83, the ram 70 passing through a suitable opening in the tray. The ram 70 is provided with an adapter bushing 85 and a coil spring 87, which reverses the movement of the ram 70 when the pressure on piston 81 is released, is mounted on ram 70 between piston 81 and adapter bushing 85.

The molding unit 69 is lifted from the molding compartment 51 by means of a pneumatic lifting unit comprising an air cylinder 90 containing a piston 91 to which is attached a hollow piston rod 92. Cylinder 90 is secured to end wall 11 by brackets 93 and 94. A handle 96 having a hollow grip 97 is mounted on the upper end of piston rod 92. Two supporting strips 100 and 101 diverge outwardly from the sides of handle 96 and are secured to rim 83 on opposite sides of supporting tray 82 whereby the molding unit 69 is securely attached to and responsive to the movements of piston rod 92. A brace 102 extends between strips 100 and 101. Molding unit 69 may be securely held in position with respect to molding compartment 51 during the molding operation through two locking knobs 105 which are attached to strips 100 and 101 and cooperate with two locking hooks 106, mounted on sides 52 and 53 in pivots 107. Movement of hooks 106 with respect to knobs 105 is controlled by arms 108 which pass through guide bearings 109, mounted on top 25. Arms 108 are provided with hooked ends 110. Ears 112 are positioned on upper gate 58 in such manner that they push the hooked ends 110 against rollers 113 when upper gate 58 is retracted thereby disengaging knobs 105 and hooks 106 and guiding the ends 110 out of the path of upper gate 58. Springs 114 are provided on arms 108 adjacent guide bearings 109.

The air supply for the pneumatic lifting system above described is provided by an air pump 115 from which air passes into cylinder 90 through a hose 116. A passageway 117 through piston 91 admits air to the interior of piston rod 92 and an air line 119 leads from piston rod 92 to the interior of grip 97. Trigger 120 controls a valve (not shown) which releases the air in grip 97 to the atmosphere thereby nullifying the lifting power of the air on piston 91. Another air line 121 leads from the top of piston rod 92 through a valve (not shown) controlled by button 122 to the ejector units 75. The ejector units 75 are actuated, when desired, by depressing button 122.

A conveyor 125 may be provided to receive the molded product as it is ejected from the molding unit 69 and to convey it away. Conveyor 125 passes over a spindle 126 supported in brackets 127 and 128 which are secured to side wall 14 and top 25, respectively.

In order to facilitate the operation of the machine, and in particular the operation of the gates 57 and 58 and the hydraulic ram unit 80, there are provided a number of switches and electrical contacts. A contact unit 130 is mounted on wall 54 and a contact unit 131 is mounted on brace 102 in such a manner that electrical engagement with contact unit 130 is made when the molding unit 69 is lowered and locked in position in molding compartment 51. Contact unit 131 is electrically connected with the hydraulic pump unit 80 through a pressure regulator switch 132. Limit switches 133 and 134 are mounted on top 25 adjacent one side of upper gate 58, and a cam 135 is mounted on upper gate 58 in such manner that the arms of the limit switches 133 and 134 are actuated in response to the movements of the upper gate 58 as hereinafter described. Limit switch 134 is electrically connected to a light bulb 136 and limit switch 133 is electrically connected to motor 67 and to contact unit 130. Pressure regulator switch 132 is electrically connected to limit switch 133 and motor 67. Contact unit 130 is electrically connected through a time limit device 137 to motor 67. Time limit device 137 which has a setting dial 138 for adjusting its operation, is mounted in a panelboard 139, which is secured to top 25 and bracket 94. Also mounted in panelboard 139 is a master switch 140, having a lever 141, which controls the flow of electrical energy for the operation of all electrically actuated units in the machine. By suitable adjustment of master switch 140, reversible motor 47 may be operated in a forward or in a reverse direction.

Referring particularly to Figs. 8, 8a, 8b, and 8c, there will be seen the relative position of the limit switches 133 and 134 with respect to the gates 57 and 58 at four different stages during the operation of the machine of the invention. Fig. 8 shows both gates extending into the molding compartment 51 thereby closing molding port 27, the catch 61 having pulled lower gate 57 into molding compartment 51 as upper gate 58 was pushed forward from the position shown in Fig. 8a in which both gates are shown just at the point of entering compartment 51. It will be observed that in Fig. 8 the limit switch 133 has just overridden the end of cam 135 thereby stopping motor 67 and the limit switch 134 has just ridden onto the other end of cam 135, energizing light 136. In Fig. 8a the lower gate 57 is shown extending into molding compartment 51 and closing molding port 27, while the upper gate 58 is drawn clear of the compartment 51. This position is reached after the molding operation has been completed and motor 67 has been energized to pull upper gate 58 out of compartment 51. When gate 58 reaches this position, the contact arm of limit switch 133 slips off the end of cam 135 and deenergizes motor 67. Fig. 8c shows both lower gate 57 and upper gate 58 in fully retracted position.

It will be obvious that other electrical controls may be provided to operate automatically other portions of the machine such as, for example, the pneumatic lifting mechanism. It will also be apparent that the various automatic controls may be omitted altogether and the motor 67 and hydraulic pump 80 operated by manual switches.

The operation of the machine proceeds as follows, the lower gate 57 and the upper gate 58 being at rest in the position shown in Fig. 8b. The machine is started by placing master switch 140 in forward position. This energizes motor 47 and air compressor 115. Charging of the various solid components of the molding mixture through hopper 31 into the mixing chamber 19 is then begun. Continuous charging of the solid materials may be effected in any suitable manner, as for example, by one or more bucket conveyors (not shown), the movement of which may be synchronized with the operation of the machine. The materials as they enter mixing chamber 19 are agitated and mixed by mixing blades 39 and helical screw 37. Helical screw 37 also gradually conveys the mixture through the chamber toward molding port 27. As the materials reach the forward end of mixing chamber 19, the solvent or fluxing agent for the mixture is admitted to the bore 42 of shaft 36 through swivel valve 50 and, as the shaft rotates, is discharged under pressure into mixing chamber 19 through nozzles 43. Pigment or other coloring matter may be introduced with the solid materials through hopper 31 but in some cases the coloring matter may be more conveniently introduced dissolved or suspended in the solvent.

When sufficient material has been compounded and mixed in chamber 19, and accumulated at the forward end thereof, the molding cycle is begun. The molding unit 69 is lowered into molding compartment 51 by depressing trigger 120 thereby allowing air to escape from grip 97 and permitting piston 91 to move downwardly in air cylinder 90. As the molding unit 69 comes into position in molding compartment 51, hooks 96 engage locking knobs 105. Simultaneously, contact units 130 and 131 come together and complete a circuit which energizes motor 67. Motor 67 retracts upper gate 58, which as previously noted was at rest in the position shown in Fig. 8b, and, owing to the operation of catch 61, lower gate 57 is simultaneously retracted and gradually pulled out of molding compartment 51, thereby opening molding port 27. As molding port 27 opens, the compounded plastic molding material in mixing chamber 19 is forced by the combined action of impeller blades 38 and helical screw 37 into molding compartment 51. During this interval, upper gate 58 is drawn to fully retracted position shown in Fig. 8c and its direction of movement reversed. As upper gate 58 reaches the position shown in Fig. 8a, the catch 61 engages lower gate 57 at the forward end of slot 60 and lower gate 57 is pulled forward with upper gate 58. As the gates 57 and 58 move from the position shown in Fig. 8a to the position shown in Fig. 8, molding port 27 is gradually closed, and when the gates have completely closed molding port 27 (Fig. 8) the contact arm of limit switch 133 overrides cam 135 and deenergizes motor 67 thereby stopping the movement of the gates. Simultaneously limit switch 134 is actuated by cam 135 and light 136 is energized, indicating to the operator that molding port 27 has been closed. The movement of the contact arm of limit switch 133 which de-energizes motor 67 energizes hydraulic pump unit 80 which, by acting upon hydraulic ram 70, exterts a compacting pressure upon the contents of molding compartment 51. When a predetermined pressure has been reached, pressure regulator switch 132 de-energizes hydraulic pump unit 80 and simultaneously energizes motor 67 which, by driving wheel 65, draws upper gate 58 out of the molding compartment 51. As upper gate 58 reaches the position shown in Fig. 8b, the contact arm of limit switch 133 overrides the forward end of cam 135 and motor 67 is de-energized. At the same time the ears 112 on upper gate 58 push the hooked ends 110 of arms 108 against rollers 113 thereby disengaging hooks 106 and locking knobs 105 and releasing molding unit 69. The molding unit 69 and the molded product adhering to it are now ready to be lifted from molding compartment 51 for the purpose of placing the product on conveyor 125. This is done by releasing trigger 120, which during the molding operation hereinabove described has been held in a depressed position. Release of trigger 120 allows the air in cylinder 90 to push piston 91 upwardly until molding unit 69 has been lifted clear of molding compartment 51 as shown in phantom in Fig. 2. The molding unit 69 is then swung 90° to the left, as shown in phantom in Fig. 1, which places the product directly over conveyor belt 125. The product is ejected by depressing button 122 which actuates pistons 76 of ejector unit 75 forcing frame 77 and compression plate 78 downwardly. After the product has been ejected, molding unit 69 is returned to engaged position in the molding compartment 51 and the molding cycle repeated.

In the foregoing description of the operation of the machine it has been assumed that the plastic materials being handled have sufficient coherence to resist flow after molding. When the machine is used for molding materials such as concrete, however, the molded product must be provided with a pallet 142 to support the material during the curing stage and suitable devices must be attached to the machine to accommodate and handle the pallets. For supporting the pallets, when the molded product is being removed from the molding compartment 51, there is provided a supporting device comprising a clamp 145 which is secured to hydraulic ram 70 and arms 146 secured to clamp 145 by springs 147. Arms 146 have a width equal to that of the interior of the molding compartment 51 and are secured to plate 71 by hinges 148. To guide the arms 146 into the molding compartment when the molding unit 69 is returned after ejecting the molded product, there are provided rollers 150 and 151 secured to walls 52 and 53 respectively. The operation of these rollers is shown in Fig. 3a. When the pallet-supporting device is used, the plate 71, the frame 77 and the compression plate 78 are replaced with equivalent units of appropriate size to accommodate the arms 146 within the molding compartment 51.

Pallets 142, which have two opposite edges rabbetted to provide for reception of the bent ends 149 of arms 146, are stacked between wall 55 and the end of a housing 152, which encloses the gate driving mechanism, as shown in Fig. 2a. When pallets are used the forward portion 58a of upper gate 58 is removed and the pallets rest upon lower gate 57. When upper gate 58 is driven forward toward molding compartment 51, a pallet 142 is pushed ahead of it into the compartment and remains with the molded product until the product has been removed and cured.

The machine of the invention may also be used to mold relatively thin solid articles, such as tiles. In this case the mold core 72 is not required nor is the compression plate 78; the tile is formed within the area circumscribed by frame 77. If desired, a series of tiles may be molded simultaneously by replacing frame 77 with a frame having suitable partitions extending between the sides therof.

The relative position of the plate 71 in molding compartment 51 may be varied to accommodate the particular product to be molded by inserting suitable adapter sections between ram 70 and plate 71. When products such as tiles are to be molded, for example, the plate 71 may be lowered with respect to the end of ram 70 by means of an adapter section 154. Fig. 5 shows the use of adapter section 154 and also shows the action of the frame 77 in ejecting a tile product.

If it is desired to form molded products of various dimensions, the cross-sectional area of the molding compartment 51 may be conveniently varied by means of liners 156 for the walls of the compartment, as shown in Fig. 7.

In molding hollow articles such as building block 158 (Fig. 4), it will be apparent that when the molding unit 69 is secured in molding unit 51 the mold core 72 extends almost to the surface of the upper gate 58 (or the pallet 142, if used) leaving only enough clearance to accommodate the slight downward movement of the hydraulic ram 70 when the product is compressed. Products having a bottom portion, such as boxes, may be molded, however, by using a shorter core having a flat lower surface which will permit a layer of the plastic composition to be formed between the lower surface of the core and the surface of the supporting plate.

If it is desired to maintain the contents of mixing chamber at an elevated temperature, as for example, when thermoplastic materials are being handled, the outer face of wall 20 may be provided with strip heaters 159.

It will be obvious that various other changes and modifications may be made in the machine hereinabove described and illustrated in the accompanying drawings without departing from the scope of the invention as defined in the appended claims, and it is therefore intended that the foregoing description shall be interpreted in an illustrative and not in a limiting sense.

I claim:

1. A mixing and molding machine comprising a chamber for receiving the components of a molding mixture, mixing and conveying means in said chamber, a molding compartment having an open intake end communicating with the top of said chamber and an open discharge end opposite said intake end, means for closing said open intake end and thereby isolating the molding compartment from the said chamber, and means intermittently insertable in said discharge end for closing said end during the molding operation but removable therefrom for discharge of the molded product.

2. A mixing and molding machine comprising a horizontal chamber for receiving the components of a molding mixture, means for continuously mixing and conveying the mixture in said chamber, a molding compartment having an open intake end communicating with the top of said chamber and an open discharge end opposite said intake end, means for intermittently closing said open intake end and thereby isolating the said molding compartment from the said chamber, and means intermittently insertable in said discharge end for closing said end during the molding operation but removable therefrom for discharge of the molded product.

3. A mixing and molding machine comprising a horizontal chamber adapted to receive the components of a molding mixture at one end thereof, means for continuously mixing and conveying the mixture to the opposite end of said chamber, a molding compartment having an open intake end communicating with the top of said chamber adjacent the said opposite end thereof and an open discharge end opposite said intake end, means for intermittently closing said open intake end and isolating the said molding compartment from the said chamber, and means intermittently insertable in said discharge end for closing said end during the molding operation but removable therefrom for discharge of the molded product.

4. A mixing and molding machine comprising a horizontal chamber adapted to receive the components of a molding mixture at one end thereof, means for continuously mixing and conveying the mixture to the opposite end of said chamber, a molding compartment having an open intake end communicating with the top of the said chamber adjacent the said opposite end thereof and an open discharge end opposite said intake end, means for intermittently closing the said open intake end and thereby isolating the said molding compartment from the said chamber and means, including a pressure exerting molding mechanism, adapted to be intermittently engaged in said molding compartment for closing the said open discharge end during the molding operation and vertically removable therefrom for discharge of the molded product.

5. A mixing and molding machine comprising a horizontal chamber for receiving the components of a molding mixture, means for continuously mixing and conveying the mixture in said chamber, a molding compartment having an open end communicating with the top of the said chamber, a reciprocally movable upper plate, a subjacent plate adapted to move in response to the movement of the said upper plate, said upper and said lower plate being movable into the lower portion of said molding compartment and across the open end thereof thereby forming a bottom for said molding compartment and isolating the said molding compartment from the said chamber, and said upper plate being withdrawable from said molding compartment independently of said lower plate.

6. A mixing and molding machine comprising a horizontal chamber for receiving the components of a molding mixture, means for continuously mixing and conveying the mixture in said chamber, a molding compartment having an open end communicating with the top of the said chamber, a pressure exerting molding mechanism adapted to be intermittently engaged in said molding compartment, a reciprocally movable upper plate, a subjacent plate adapted to move in response to the movements of the said upper plate, said upper and said lower plate being movable into the lower portion of said molding compartment and across the open end thereof thereby forming a bottom for said molding compartment and isolating the said molding compartment from the said chamber, and said upper plate being withdrawable from said molding compartment independently of said lower plate.

7. A mixing and molding machine comprising a horizontal chamber adapted to receive the components of a molding mixture at one end thereof, a helical screw having adjustable-pitch mixing blades mounted thereon for continuously mixing and conveying the mixture to the opposite end of said chamber, a molding compartment having an open intake end communicating with the top of said chamber adjacent the said opposite end thereof and an open discharge end opposite said intake end, means for intermittently closing said open end and isolating the said molding compartment from the said chamber, and means intermittently insertable in said discharge end for closing said end during the molding operation but removable therefrom for discharge of the molded product.

8. A mixing and molding machine comprising a horizontal chamber adapted to receive the components of a molding mixture at one end thereof, a helical screw having adjustable-pitch mixing blades mounted thereon for continuously mixing and conveying the mixture to the opposite end of said chamber, a molding compartment having an open end communicating with the top of said chamber adjacent the said opposite end thereof and means for intermittently closing said open end and isolating the said molding compartment from the said chamber, said helical screw having a shaft at least part of which is hollow and said shaft having a plurality of nozzles mounted thereon and communicating with the interior of the hollow part of the shaft.

9. A mixing and molding machine comprising a horizontal chamber for receiving the components of a molding mixture, means for continuously mixing and conveying the mixture in said chamber, a molding compartment having an open end communicating with the top of the said chamber, a reciprocally movable upper plate, a subjacent plate adapted to move in response to the movements of the said upper plate, said upper and said lower plate being movable into the lower portion of said molding compartment and across the open end thereof thereby forming a bottom for said molding compartment and isolating the said molding compartment from the said chamber, and plate-moving means for imparting reciprocal movement to said upper plate, said upper plate being withdrawable from said compartment independently of said lower plate.

10. A mixing and molding machine comprising a horizontal chamber for receiving the components of a molding mixture, means for continuously mixing and conveying the mixture in said chamber, a molding compartment having an open end communicating with the top of the said chamber, a reciprocally movable upper plate, a subjacent plate adapted to move in response to the movements of the said upper plate, said upper and said lower plate being movable into the lower portion of said molding compartment and across the open end thereof thereby forming a bottom for said molding compartment and isolating the said molding compartment from the said chamber, plate-moving means for imparting reciprocal movement to said upper plate, said upper plate being withdrawable from said compartment independently of said lower plate, and electrical means for controlling the operation of said plate-moving means.

11. A mixing and molding machine comprising a horizontal chamber for receiving the components of a molding mixture, means for continuously mixing and conveying the mixture in said chamber, a molding compartment having an open end communicating with the top of the said chamber, a pressure exerting molding machanism adapted to be intermittently engaged in said molding compartment, a reciprocally movable upper plate, a subjacent plate adapted to move in response to the movements of the said upper plate, said lower plate being movable into the lower portion of said molding compartment and across the open end thereof thereby forming a bottom for said molding compartment and isolating the said molding compartment from the said chamber, said upper plate being adapted to propel into said molding chamber a pallet supported upon said lower plate, and pallet supporting means mounted upon said pressure-exerting molding mechanism.

12. A mixing and molding machine comprising a horizontal chamber for receiving the components of a molding mixture, means for continuously mixing and conveying the mixture in said chamber, a molding compartment having an open end communicating with the top of the said chamber, a pressure exerting molding mechanism adapted to be intermittently engaged in said molding compartment, a reciprocally movable upper plate, a subjacent plate adapted to move in response to the movements of the said upper plate, said upper and said lower plate being movable into the lower portion of said molding compartment and across the open end thereof thereby forming a bottom for said molding compartment and isolating the said molding compartment from the said chamber, said upper plate being withdrawable from said compartment independently of said lower plate, and a pneumatically operated lifting means for said pressure-exerting molding mechanism.

HAROLD CORBETT.

REFERENCES CITED

The following references are of record in the file of this patent:

UNITED STATES PATENTS

| Number | Name | Date |
| --- | --- | --- |
| 949,505 | Snelling | Feb. 15, 1910 |
| 1,534,154 | Bornhauser et al. | Apr. 21, 1925 |
| 1,733,706 | Widin | Oct. 29, 1929 |
| 1,858,956 | Hepperle | May 17, 1932 |
| 1,977,515 | Klippel | Oct. 16, 1934 |
| 2,402,805 | Cousino | June 25, 1946 |
| 2,434,690 | Ferla | Jan. 20, 1948 |